United States Patent [19]

Adler et al.

[11] Patent Number: 5,533,583

[45] Date of Patent: Jul. 9, 1996

[54] NON-TRACKBOUND VEHICLE WITH AN ELECTRODYNAMIC CONVERTER AND A THROTTLE

[75] Inventors: Uwe Adler, Schweinfurt; Hans-Jürgen Drexl, Schonungen; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerrn; Holger Westendorf, Hambach; Rainer Wychnanek, Madenhausen, all of Germany

[73] Assignee: Mannesmann Aktiengesellschaft, Dusseldorf, Germany

[21] Appl. No.: 211,141

[22] PCT Filed: Sep. 30, 1992

[86] PCT No.: PCT/DE92/00834

§ 371 Date: Jun. 22, 1994

§ 102(e) Date: Jun. 22, 1994

[87] PCT Pub. No.: WO93/07020

PCT Pub. Date: Apr. 15, 1993

[30] Foreign Application Priority Data

Oct. 4, 1991 [DE] Germany .......................... 41 33 014.5

[51] Int. Cl.⁶ .................................................. B60K 1/04
[52] U.S. Cl. ............................................. 80/65.4; 318/150
[58] Field of Search ......................... 180/65.5, 65.4, 180/165, 55.2; 318/150, 139

[56] References Cited

U.S. PATENT DOCUMENTS 3,837,419 9/1974 Nakamura .............................. 180/65.5
4,495,451 1/1985 Barnard .................................. 180/65.5
4,588,040 5/1986 Albright, Jr. et al. .................. 180/65.4
5,224,563 7/1993 Iizuka et al. ........................... 180/65.5
5,418,437 5/1995 Couture et al. ........................ 180/65.5

FOREIGN PATENT DOCUMENTS 2943554  5/1981  Germany .
3112629  10/1982  Germany .
 228589  10/1985  Germany .
3714151  10/1987  Germany .
4000678  7/1991  Germany .

Primary Examiner—Richard M. Camby
Attorney, Agent, or Firm—Cohen, Pontani, Lieberman, Pavane

[57] ABSTRACT

A passenger automobile or truck contains a unit which is formed by an internal combustion engine and a generator and which powers electric motors coupled with driving wheels of the vehicle via an energy distributor in the form of power electronics. An accumulator which can likewise be coupled with the electric motors via the energy distributor is provided as an additional power source. An electronic control unit receives driving signals from an accelerator pedal, in particular a position signal and a speed signal. The position signal of the throttle is interpreted as a request for a determined permanent output to be supplied by the internal combustion engine.

The internal combustion engine is revved up to a new operating point in an "optimal" manner (e.g. with favorable fuel consumption), for example when a higher output is requested, while the generator is entirely or partially uncoupled from the load. Energy for accelerating the vehicle is provided in the meantime by the accumulator. The speed signal determines the amount of acceleration. By means of a selector switch, an operation powered exclusively by stored energy may be switched on when the internal combustion engine is turned off if no special sensors are provided for this purpose.

15 Claims, 3 Drawing Sheets

NON-TRACKBOUND VEHICLE WITH AN ELECTRODYNAMIC CONVERTER AND A THROTTLE

FIELD OF THE INVENTION

The invention relates to non-trackbound vehicles, generally, and more particularly to vehicles having at least one wheel coupled to an electric motor which drives the wheel and which is supplied with current via an energy distributor depending on control signals generated by a control unit, the current being supplied by a generator coupled with an internal combustion engine and the control unit receiving from a throttle a driving signal which is at least representative of the position of the throttle.

DESCRIPTION OF THE PRIOR ART

The most common non-trackbound vehicles are passenger automobiles and trucks. These vehicles were hitherto conventionally operated by internal combustion engines. Internal combustion engines have a characteristic torque/speed curve which, at a determined speed range, has a more or less pronounced torque maximum bordered by regions with greatly reduced torque at higher speeds and especially at lower speeds.

Engine output is calculated as the product of torque and speed. To achieve the fastest possible acceleration of a vehicle, the maximum available output must be transmitted to the driving wheels. When the vehicle engine is operating in a low speed range, only a relatively slow acceleration can take place even at the maximum throttle valve opening, since there is insufficient available output. The output for acceleration can be increased by shifting into a lower gear, since higher speed and accordingly a higher available output are provided in a lower gear. Practically all vehicles having an internal combustion engine are outfitted with a gear shift or automatic transmission to make use of the available output of the engine.

Electric drives which are chiefly used in trackbound vehicles, e.g. in locomotives, have the advantage that the dependency of the output on speed is considerably less pronounced than in internal combustion engines. For this reason, electric drives can generally be utilized without a transmission.

It has already been proposed to drive non-trackbound vehicles, i.e. passenger automobiles, trucks and busses, by means of one or more electric motors which are directly coupled with the wheels. The electric motors are powered by an internal combustion engine/generator unit via an energy distributor constructed as power electronics. A hybrid engine of this kind has a number of advantages. When the wheels are driven by means of electric motors, not only can a gear shift or automatic transmission be dispensed with, but it is also possible with thrusting engine or during a braking process to operate the electric motors as generators so that the occurring electrical output can be used, e.g., for heating or the like.

It has also already been suggested to couple an internal combustion engine with an energy storage constructed as a flywheel in a vehicle. In this case, the internal combustion engine can always be operated in an optimum operating state, e.g. in a range of the most favorable specific fuel consumption. The generator coupled with the internal combustion engine supplies electrical energy to the driving electric motors. When the vehicle is accelerated, additional energy is drawn from the flywheel. During a braking process when the electric motors are operating as generators, energy is obtained from the latter and can be stored in the flywheel as mechanical energy.

In practice, however, former proposals for providing a vehicle having an internal combustion engine with a generator and associated driving electric motors have only been realized in part.

A non-trackbound vehicle is known from DE 40 00 678 A1. This vehicle has an internal combustion engine, an electric generator driven by the latter, an electrically chargeable and dischargeable flywheel storage, at least one electric drive motor, and an energy distributor which is controlled by a control unit and constructed as power electronics. The electric drive motor is powered by the energy distributor with electric current from the generator and/or the flywheel storage. Depending on the charge state of the flywheel storage, the electronic control unit allows the internal combustion engine to run either at idling speed (when the storage is extensively charged) or at a second speed (when the storage is mostly discharged). This second speed represents a quantity which is selected on the basis of optimization criteria (e.g. fuel consumption, pollutant emission).

The concept of a vehicle with electrodynamic converter discussed above is very promising with regard to economizing on energy, pollution abatement and other requirements. However, the driver's readjustment from the customary vehicle with internal combustion engine to a vehicle with quasi-electric drive may be a possible source of problems in the use of such vehicles. Since the vehicle is ultimately driven by electric motors, the vehicle behaves very much like a vehicle with a purely electric drive.

It is therefore an object of the present invention to provide a non-trackbound vehicle of the type mentioned above in which the driver's commands, as expressed by the movement of the throttle, in particular the accelerator pedal, are correctly interpreted and in which means are employed for converting the driver's commands into available output allowing the vehicle to behave in conformity to the driver's commands.

SUMMARY OF THE INVENTION

The aforementioned object, as well as others which will become apparent from the description provided herein, is met by a vehicle in which an energy storage means is provided which is electrically connected, via the energy distributor, with the electric motor and with the generators in that the control unit processes the driving signal in the form of a control signal for the internal combustion engine in order to bring the internal combustion engine to the output corresponding to the position of the throttle or in order to maintain it at this output, and in that the control unit further generates a control signal for taking energy from the energy storage at least so as to allow the internal combustion engine to accelerate to a new operating point in an optimal manner and/or to achieve maximum acceleration of the vehicle and/or to further increase the maximum speed of the vehicle at full engine output.

In accordance with the present invention a determined drive output to is produced fundamentally by the internal combustion engine be allocated to the driving signal, i.e. in particular to the respective angular position of the throttle (accelerator pedal). The driver requests a certain output by actuating the accelerator pedal. The characteristic curve between the demanded output and the position of the accelerator pedal is preferably nonlinear and is relatively flat in the initial region so as to enable an easy proportioning of output in a slow moving vehicle.

The output selected according to the position of the accelerator pedal should be viewed as permanent output which is basically to be provided by the internal combustion engine. The energy storage means, according to the invention, is provided in conjunction with the control unit to enable the transition between a given driving speed and a new driving speed. When the vehicle is traveling at a given initial speed $v_a$, the drive sources, i.e. the internal combustion engine/generator unit and the energy storage means, supply an output $P_a$, designated here as initial output, which is in equilibrium with the resistance, particularly air resistance, rolling resistance of the tires and the like, acting on the vehicle at constant speed. A continued depression of the accelerator pedal in this stationary state of the vehicle is interpreted as a demand for increased output. In providing this increased output, the vehicle is accelerated until reaching a final speed $v_e$ at which the increased output $P_e$ is in equilibrium with the resistance acting on the vehicle.

According to the invention, the control unit uses the energy storage means in a very specific manner to organize the transition from an output $P_a$ produced in stationary driving operation to a new output $P_e$.

In accordance with one aspect of the present invention, the internal combustion engine is "optimally" accelerated to a new operating point. An internal combustion engine has a family of characteristic curves. More particularly, a curve for optimal specific fuel consumption may be identified in the speed/torque characteristic field. Assuming that the internal combustion engine is running at a relatively low speed and a demand for increased output is made by the driver by further depressing the accelerator pedal, the engine must be brought to a higher speed since the newly selected output is interpreted as a permanent output to be provided by the internal combustion engine. As is well known, when the throttle valve opening increases while the burden on the engine remains the same in other respects, the speed only increases very slowly depending on the loading of the engine. The invention makes it possible to increase the speed from an operating point located on the above-mentioned curve of optimal specific fuel consumption to a second operating point also located on this curve in such a way that very little fuel is consumed. In so doing, a continuous or stepwise increase in speed is effected with a corresponding adjustment of the torque and output. For this purpose, the generator can be decoupled entirely or partially from the electric motor so that the generator runs completely or partially on idle in practice. Accordingly, the speed of the internal combustion engine can be increased quite rapidly when the load on the generator is reduced, specifically so as to enable an increase in the vicinity of the curve of the optimal specific fuel consumption mentioned above.

In accordance with a further aspect of the present invention, the internal combustion engine can also be revved up quickly to the desired speed with the generator on idle, whereupon the generator is coupled with the electric motor again gradually, that is, slowly enough so that the speed does not decrease again. In the meantime, the drive of the electric motor is powered by the energy storage means. This results in a smooth transition from power supplied by the internal combustion/generator to power supplied by the energy storage means.

In addition to an "optimal" acceleration of the internal combustion engine, the drawing of power from the energy storage means can also be controlled in such a way that the vehicle achieves maximum acceleration. In so doing, it is necessary to ensure that the acceleration is adapted to the total charge stored in the energy storage means so that the storage means is not depleted during the acceleration process, which could lead to dangerous situations in traffic.

There is a certain similarity between maximum acceleration of the vehicle and the step by which the maximum speed of the vehicle determined, per se, by the maximum output of the internal combustion engine is further increased by drawing additional power from the energy storage means at maximum output of the internal combustion engine and supplying it to the electric motor.

Warning devices which notify the driver when the available energy in the energy storage means has dropped to a residual amount are provided in order to avoid dangerous situations.

The steps discussed above for making optimal use of the energy storage means in certain situations relate to special driving signals which will be discussed more fully in the following. These driving signals notwithstanding, energy can be supplied, according to the invention, from the energy storage means to the electric motor in order to make extra energy available for negotiating ascending grades at roughly constant speed without a change in the engine torque and/or to replace a part of the engine output by drawing on stored energy and/or to enable driving operation when the engine is turned off. The latter variant is of particular importance for city traffic and for so-called stop-and-go driving in backed up traffic, since a maximum abatement of pollution can be achieved at relatively low fuel consumption. The vehicle is preferably provided with a selector switch. When the selector switch is actuated, the internal combustion engine is turned off assuming that there is sufficient energy in the energy storage means for operating purely on stored energy.

In principle, the energy storage means according to the invention can be a mechanical storage device, e.g. a flywheel, but is preferably a storage battery or accumulator for storing electrical energy.

The factors discussed above, e.g. fastest possible acceleration of the internal combustion engine, low fuel consumption, low pollutant emission and the like, may be taken into account simultaneously, advisably by weighting the individual parameters.

As indicated above, the invention provides that the generator is electrically decoupled from the electric motor entirely or partially and the internal combustion engine, together with the generator, is gradually coupled with the electric motor again when reaching the new operating point and that energy is fed to the electric motor from the energy storage means during the decoupling phase in such a way that the transitions are effected smoothly during the coupling.

As discussed above, the driving signal plays a special part in the controlled use of the energy storage means. In the simplest case, a position sensor located at the throttle, i.e. particularly at the accelerator pedal, transmits a position signal $\alpha$ to the control unit. The control unit can then determine a speed signal $\alpha$ and an acceleration signal $\alpha$ for the movement of the accelerator pedal from the time curve of this position signal $\alpha$ by differentiation. The speed signal and acceleration signal for the accelerator pedal can also be supplied directly by corresponding sensors at the accelerator pedal.

In addition to the driving signals mentioned above, which depend on the actuation of the accelerator pedal, the invention also provides a transmitter for a maximum acceleration requirement (kickdown) and possibly another selector switch for intermittent operation (city traffic).

The energy storage is outfitted with a charge status sensor which transmits to the storage means means a signal representing the energy still contained in the energy storage means. Based on these values and other values which are already stored, the control unit can determine how much energy per time unit (output) may be taken from the energy storage means so that the acceleration leads to the desired new final vehicle speed without depleting the energy storage means during the acceleration process and so as to prevent dangerous situations which may occur as a result of decreasing acceleration.

Switching on additional output from the energy storage means at maximum engine output permits a further increase in the maximum speed as determined by the maximum output of the internal combustion engine. According to the invention, the last range of the throttle path is provided for obtaining this additional thrust by means of additional output from the energy storage means. The internal combustion engine and energy storage means are both used for driving the vehicle only when the accelerator pedal is completely depressed.

As will be clear from the foregoing discussion, energy is taken from the storage means on the one hand without conscious effort on the part of the driver merely by appropriate operation of the control device which, apart from the driving signal, contains status signals from the internal combustion engine, generator, storage means, and driving electric motors so that permanent signals relating to the speed and torque of the internal combustion engine or generator, the charge state of the storage means, and the speed of the electric motors are available at the control unit. On the other hand, the driver may also actively take energy from the storage means, e.g., by selecting a drive by means of the above-mentioned selector switch in city traffic also when the internal combustion engine is stopped.

The invention can also be used advantageously in a vehicle which is outfitted with a device for automatically regulating speed. Each time the actual driving speed diverges from the adjusted reference driving speed by more than a predetermined value, stored energy can be used to maintain constant speed.

The above-mentioned possibility for switching to a quasi exclusively electrical operating mode of the vehicle in city traffic by means of selector switches can also be linked to a learning function of the control unit. The control unit counts the occurrence of braking and accelerating processes within a determined time window. If the average occurrence exceeds a threshold value, a "city driving" mode, i.e. a quasi exclusive electromotive drive, is automatically switched on, wherein, depending on its charge state, the storage is only charged occasionally by switching on the internal combustion engine.

A certain set of problems arises in relation to the naturally limited capacity of the energy storage means. If the vehicle is very sharply accelerated when passing another vehicle and energy is taken from the energy storage means for this purpose, it must be ensured that the stored energy will be sufficient for the entire passing process. The energy required for passing depends on the required acceleration of the vehicle, the mass of the vehicle, the road configuration (grade) and other influencing variables. Of course, there are certain output limits which must be allowed for by the driver—as is also the case in conventional vehicles with internal combustion engines—so that he does not begin a passing process which is impossible to complete based on the vehicle power.

However, in the case of the vehicles under discussion, it may happen that the energy storage means is rather radically discharged just after considerable energy is consumed. In this case, a maximum acceleration of the vehicle for a passing process would be impossible under certain circumstances. For this reason, the invention provides a signalling device for the charge state of the energy storage means. This signalling device may be realized as a visual or acoustic device, but is preferably realized as a tactile signalling device, in particular, as resistance in the accelerator pedal. If the charge state of the energy storage means is insufficient, the driver will perceive an unusually high resistance when actuating the accelerator pedal. This alerts the driver of insufficient stored energy for maximum vehicle acceleration. In addition, the driver can be warned by a visual or acoustic signal whose intensity depends on the discharge state of the energy storage.

The various features of novelty which characterize the invention are pointed out with particularity in the claims annexed to and forming a part of the disclosure. For a better understanding of the invention, its operating advantages, and specific object attained by its use, reference should be had to the drawings and descriptive matter in which there are illustrated and described preferred embodiments of the invention.

BRIEF DESCRIPTION OF THE DRAWINGS

An illustrative embodiment of the present invention will be explained in more detail in the following with reference to the drawings, in which.

DETAILED DESCRIPTION OF THE PREFERRED EMBODIMENTS

Figure 1:
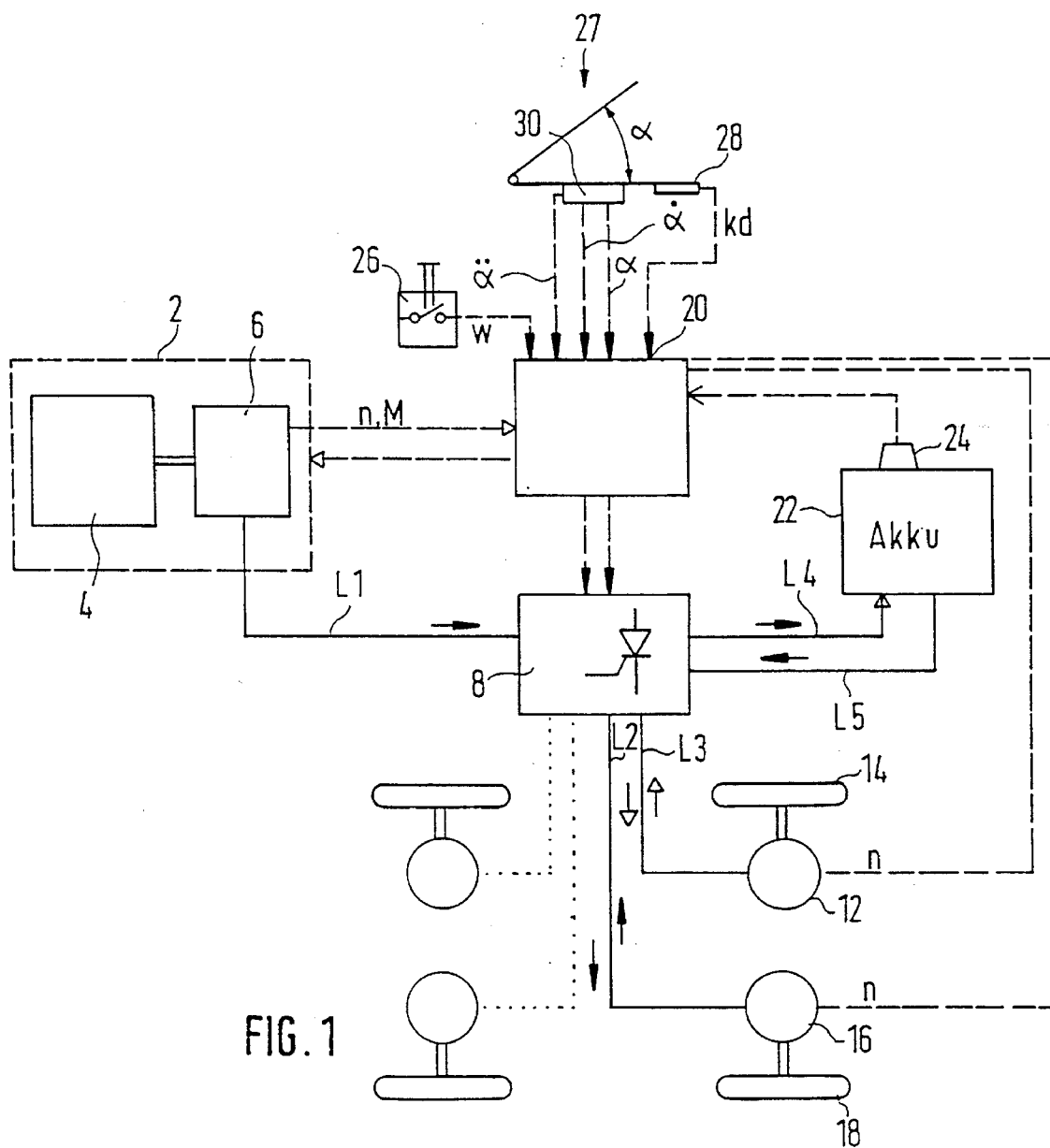
FIG. 1 shows a schematic view of essential elements of a passenger automobile outfitted with an electrodynamic converter and an accumulator as energy storage.

FIG. 1 is a schematic view of essential drive elements of a passenger car. An internal combustion engine/generator unit (hereinafter VGE) 2 formed by an internal combustion engine 4 and an electric generator 6 supplies electric power, via a line L1, to an energy distributor 8 which is constructed as power electronics and which supplies electric power, via lines L2 and L3, to two electric motors 12 and 16 which are directly coupled to the rear wheels 14 and 18. The rear wheels 14 and 18 are accordingly driven depending on the current supplied to the electric motors 12 and 16 by the energy distributor 8.

The vehicle 10 can also be outfitted with an all-wheel drive as indicated in the lower left-hand portion of FIG. 1 by dashed lines leading to additional electric motors which are coupled with the rest of the wheels of the vehicle.

The current supplied to the electric motors 12 and 16 via the energy distributor 8 is controlled by a control unit 20 which includes a microprocessor and data storage means. Control programs, characteristic curves and the like are stored in the storage means.

In addition to the VGE 2, an energy storage 23 constructed in this instance as an accumulator 22 is provided as an additional energy source and is coupled with the energy distributor 8 via lines L4 and L5. Electrical energy is stored in the accumulator 22 and electrical energy is supplied by the accumulator 22 to the energy distributor 8, respectively, via lines L4 and L5.

A sensor 24 which transmits a signal representing the charge state of the accumulator 22 to the control unit 20 is associated with the accumulator 22. Moreover, the control unit 20 receives speed signals n from the two electric motors 12 and 16, a speed signal n and a torque signal M from the VGE 2, as well as driving signals from an accelerator pedal 27.

The accelerator pedal 27 is outfitted with a sensor arrangement 30 which sends the control unit 20 a position signal $\alpha$ representing the angular position $\alpha$ of the accelerator pedal 27, a speed signal $\dot\alpha$, and an acceleration signal $\ddot\alpha$. The signals $\alpha$, $\dot\alpha$ and $\ddot\alpha$, respectively, represent the position of the accelerator pedal 27, its actuating speed and its acceleration.

Further, a sensor 28 which supplies a "kickdown" signal kd to the control unit 20 is coupled with the accelerator pedal 27. The driver can also send a signal w to the control unit 20 via a selector switch 26 to inform the control unit 20 of the driver's request that current be supplied to the electric motors 12 and 16 exclusively from the accumulator (city driving).

Based on the signals fed to the control unit 20, the control unit 20 calculates control signals for the VGE 2 (in particular, the internal combustion engine) on the one hand and for the energy distributor 8 on the other hand. When the driver depresses the accelerator pedal 27 from a first position into a second position at a determined speed $\dot\alpha$, the control unit 20 interprets this as a request for a higher permanent output on the part of the VGE 2 so that the control unit 20 supplies control signals to the VGE 2 for revving the internal combustion engine to an operating point corresponding to the required permanent output.

Figure 3:
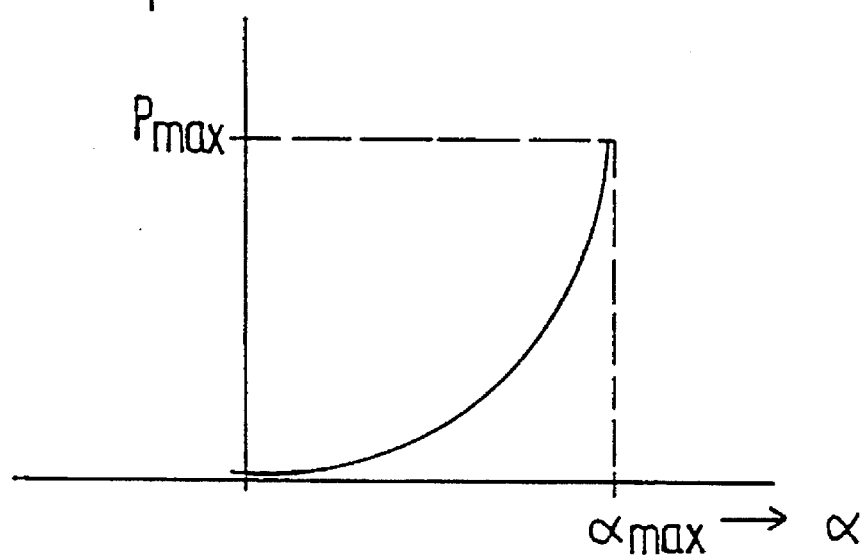
FIG. 3 shows a characteristic curve for output/accelerator pedal position.

The ratio between the accelerator pedal position and the required output is nonlinear, as shown, for example, in FIG. 3. With small accelerator pedal displacements $\alpha$, the required output changes only slightly. This enables an easy proportioning of the output requirement at low speeds.

Figure 4:
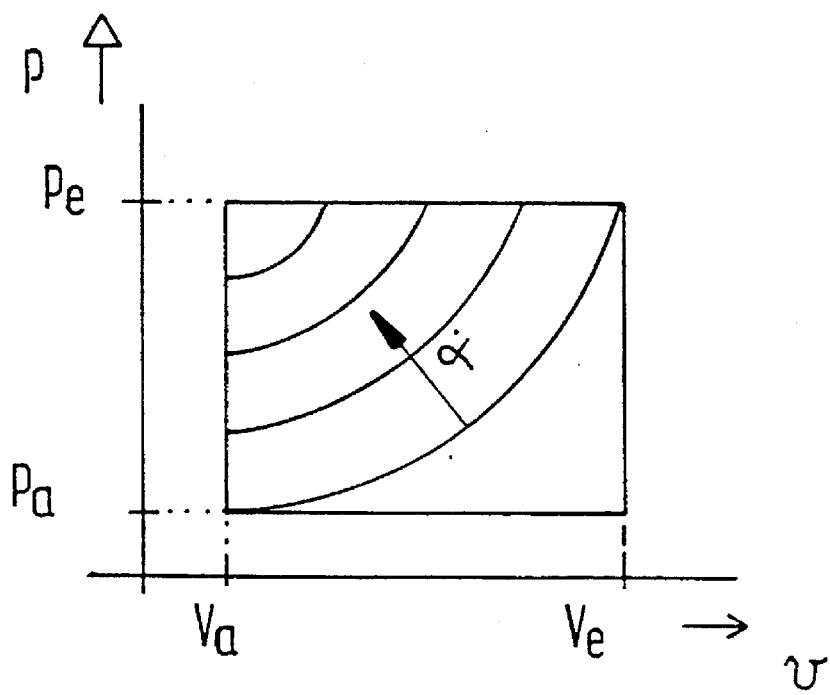
FIG. 4 shows an output/speed characteristic curve at a speed $\alpha$ of the accelerator pedal as parameter.

As is shown in principle in FIG. 4, the manner in which the vehicle is accelerated is determined by depressing the accelerator pedal 27 by a certain distance into a new accelerator pedal position $\alpha$ at a determined actuating speed $\dot\alpha$ as mentioned above. A higher, new constant speed $v_e$ of the vehicle corresponds to the requested increased output. In order to attain this speed proceeding from the previous constant speed $v_a$, wherein the internal combustion engine supplies the total output after reaching speed $v_e$, additional output which is at least equal to the previous output of the internal combustion engine ($P_a$) is first provided immediately by the energy storage 22. The speed of the internal combustion engine is then driven up until reaching a value corresponding to the aimed for output $P_e$. Acceleration of the vehicle by means of the stored energy is effected on the basis of the actuating speed $\dot\alpha$ of the accelerator pedal 27 as shown in FIG. 4. The faster the accelerator pedal 27 is actuated, the more energy is provided for accelerating the vehicle.

In this preferred embodiment example, the generator 6 is decoupled from the driving electric motors 12 and 16 when the internal combustion engine is revved up to a new operating point.

Figure 2:
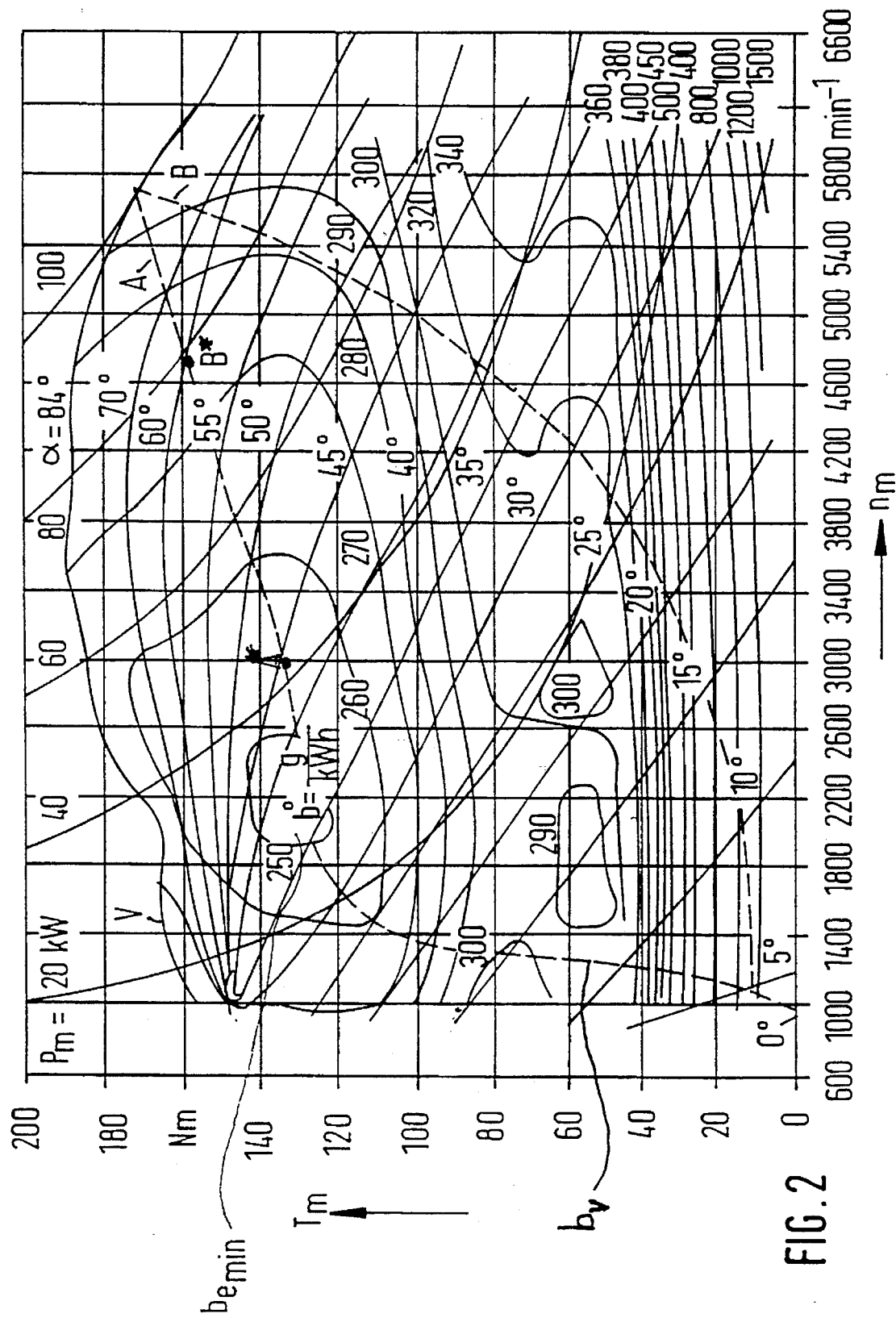
FIG. 2 shows a characteristic field of an internal combustion engine.

FIG. 2 shows characteristic performance data for a 100-kW internal combustion engine. The torque is plotted over speed. A dashed line $b_v$ represents the most favorable specific fuel consumption as a function of speed. For example, a point $b_{emin}$ with the most favorable fuel consumption of all results at speed n=2200. Although fuel consumption is lower at lower speeds, the torque is disproportionately smaller. At higher speeds, there is increased fuel consumption with a disproportionately small increase in torque.

It is assumed in the preceding example that at a vehicle speed $v_a$ during which output is applied entirely by the internal combustion engine 4, the internal combustion engine 4 operates at a speed of 3000 rpm which corresponds to the operating point A* on line $b_v$ in FIG. 2. If the driver continues to depress the accelerator pedal 27, which corresponds to a requested permanent output $P_e$, the internal combustion engine 4 must be revved up to a new operating point B* on line $b_v$.

This revving of the internal combustion engine 4 is preferably effected when the generator 6 is decoupled from the load. For this purpose, the energy distributor 8 is controlled in such a way that the electric motors 12 and 8 which are powered in order to move the vehicle forward are no longer powered completely by the generator 6, but rather entirely or partially from the energy storage 2. In this state, the internal combustion engine 4 is revved up along the line $b_v$ to the new operating point B*. There follows a gradual coupling of the generator 6 to the electric motors 12 and 16. These coupling processes are controlled by the control unit 20 in such a way that they proceed gradually so that the drive is continued smoothly.

In the example discussed above with reference to FIG. 2, the energy storage 22 is used to accelerate the vehicle allowing for favorable fuel consumption. Alternatively or in addition, other parameters may also be taken into account, e.g. the emission of pollutants, noise development, loading of the unit and the like.

When the vehicle travels at a certain constant speed and the driver desires a maximum acceleration, he fully depresses the accelerator pedal 27. In so doing, the sensor 28 generates the "kickdown" signal kd. Consequently, the maximum available output is supplied to the electric motors 12 and 16: the internal combustion engine 4 is revved up to maximum output on the one hand, and a certain maximum output is taken from the energy storage 22 on the other hand. Thus—as was described above—a very high output which is higher than the maximum output of the internal combustion engine 4 can be drawn from the energy storage 22 first. When the internal combustion engine 4 is then operated in a range of the highest output, the proportion of the output taken from the energy storage 22 can be reduced, but in such a way that an output which is greater than the maximum output applied by the internal combustion engine is still supplied to the electric motors 12 and 16.

The above-mentioned process provides an extremely powerful acceleration of the vehicle (kickdown). If the vehicle is already traveling at a maximum speed corresponding to the maximum output of the internal combustion engine 4, additional thrust can still be achieved by means of a "kickdown" in that the control unit 20 draws energy from the energy storage 22 and supplies it to the electric motors. The nominal maximum speed is thus further increased by a certain amount.

Means for notifying the driver of the charge state of the accumulator 22 are not shown in the drawing. This signalling of the charge state is not carried out by displaying numerical values, but rather in the form of acoustic, visual or tactile signals. A damping device, e.g. an adjustable pretensioning spring, which is coupled with the accelerator pedal 27 is preferred for this purpose. When falling below a determined lower threshold value of the charge state of the energy storage 22, this pretensioning spring perceptibly increases the actuating resistance of the accelerator pedal 27. In this way, the driver is alerted that the energy storage 22 momentarily contains only a small amount of energy so that increased acceleration cannot be achieved.

In city traffic, the driver can generate a signal w by actuating the switch 26 to signal the control unit 20 that the internal combustion engine 4 is switched off. This is effected on condition that there is sufficient energy stored in the accumulator 22. This operating state is appropriate for stop-and-go traffic.

As an alternative to the selector switch 26, the control unit 20 can also automatically switch to "city driving". For this purpose, the control unit 20 counts the occurrences of acceleration and braking processes (based on the speed signals n supplied by the electric motors 12 and 16) within a time window. If the average frequency of braking and accelerating processes exceeds a threshold value, the control unit 20 automatically switches to an operation in which the internal combustion engine 4 is only switched on to recharge the accumulator 22. In principle, the drive is effected exclusively with output from the accumulator 22. The latter is not only charged by the internal combustion engine, but also by current generated by the electric motors 12 and 16 which operate as generators when braking or in thrusting operation of the vehicle.

The acceleration signal α which indicates the acceleration of the accelerator pedal 27 can also be evaluated by the control unit 20 to differentiate the manner in which the driver desires to carry out a change in the vehicle speed. In addition to the speed signal α, the acceleration signal α can also be calculated by differentiation with the aid of the signal of the accelerator pedal position α detected with respect to time by the control unit 20 when no special sensors are provided for this purpose. In combination with the maximum value of the accelerator pedal angle α, the control unit 20 can also detect the presence of a "kickdown" signal when a given limiting value for the speed α or acceleration of the accelerator pedal actuation is exceeded. There is not need to install a special sensor 28 in this case.

We claim:

1. A vehicle comprising:

an internal combustion engine having a throttle;

a plurality of wheels;

an electric motor drivingly coupled to at least one of said wheels;

generating means coupled to said internal combustion engine, for generating electrical current;

control means coupled to said generating means for receiving a driving signal indicative of throttle position and at least one of throttle movement speed and throttle acceleration rate, said control means processing the driving signal to generate first and second control signals;

energy distributing means operatively coupled to said control means, said generating means, and said electric motor, said energy distributing means being adapted to receive electrical current from said generating means and to regulate current flow to said electric motor in accordance with at least one of said control signals; and energy storage means coupled to said electric motor and to said energy distributing means, wherein said energy distributing means is responsive to said first control signal to supply energy from said energy storage means to said electric motor, and wherein said internal combustion engine is responsive to said second control signal to operate at an output corresponding to a new throttle position.

2. The vehicle of claim 1, wherein said internal combustion engine is responsive to said second control signal to rev up to an output corresponding to throttle position.

3. The vehicle of claim 1, wherein said internal combustion engine is responsive to said second control signal to maintain an output corresponding to throttle position.

4. The vehicle of claim, 1, wherein said energy distributing means is responsive to said first control signal to supply sufficient current to said electric motor to permit said internal combustion engine to accelerate to an operating point in an optimum manner.

5. The vehicle of claim 1, wherein said energy distributing means is responsive to said first control signal to supply sufficient current to said electric motor to permit maximum acceleration of the vehicle.

6. The vehicle of claim 1, wherein said energy distributing means is responsive to said first control signal to supply sufficient current to said electric motor to permit an increase in maximum vehicle speed at full engine output.

7. The vehicle according to claim 1, wherein said control means is adapted to supply energy to the electric motor from the energy storage means regardless of the driving signal, thereby making available additional energy to negotiate ascending grades at roughly constant speed without a change in engine torque, accommodating replacement of a part of the engine output in stationary operating states by drawing on stored energy, and enabling driving operation when the internal combustion engine is turned off.

8. The vehicle according to claim 1, wherein said first control signal is derived to achieve fastest possible acceleration with at least one of most favorable specific fuel consumption, lowest possible pollutant emission, and lowest production of noise.

9. The vehicle according to claim 1, wherein in response to said first control signal, said generator is temporarily at least partially uncoupled electrically from the electric motor and the internal combustion engine, along with the generating means, is gradually coupled with the electric motor again after reaching a new operating point, energy being supplied to the electric motor from the energy storage means during an uncoupling phase in such a way that transitions are effected smoothly during coupling, thereby achieving optimal acceleration of the internal combustion engine.

10. The vehicle according to claim 9, wherein the driving signal further represents a requested driving operation powered exclusively by the energy storage means, said storage means being intermittently chargeable by at least one of the internal combustion engine and an electrical current generated during deceleration or braking of the vehicle by the electric motor in a generating mode of operation.

11. The vehicle according to claim 1, wherein the electric motor is supplied with power from the energy storage means and the generating means simultaneously in such a way that stored energy is sufficient for achieving the output corresponding to the new throttle position and maximum acceleration of the vehicle.

12. The vehicle according to claim 1, wherein energy is supplied from the energy storage means within a limited time in a last range of a throttle path in order to increase the maximum speed which can be achieved solely by the internal combustion engine.

13. The vehicle according to claim 1, further including a signalling device for supplying the control means with a signal indicative of a charge state of the energy storage means.

14. The vehicle according to claim 13, wherein the signalling device comprises an adjustable pretensioning spring which increases actuating resistance in the throttle (27).

15. The vehicle according to claim 1, wherein said control means is operable to detect a "kickdown" signal indicative of a simultaneous reaching of a maximum value of vehicle accelerator pedal position and an exceeding of a predetermined threshold value for at least one of speed and acceleration of accelerator pedal actuation.

* * * * *